United States Patent
Martini

(10) Patent No.: US 9,853,943 B2
(45) Date of Patent: *Dec. 26, 2017

(54) SELECTIVELY PERFORMING MAN IN THE MIDDLE DECRYPTION

(71) Applicant: iboss, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,152

(22) Filed: Sep. 3, 2015

(65) Prior Publication Data

US 2015/0381570 A1 Dec. 31, 2015

Related U.S. Application Data

(63) Continuation of application No. 14/682,703, filed on Apr. 9, 2015, which is a continuation of application No. 13/966,900, filed on Aug. 14, 2013, now Pat. No. 9,009,461.

(51) Int. Cl.
*H04L 29/06* (2006.01)
*H04L 29/08* (2006.01)

(52) U.S. Cl.
CPC ...... *H04L 63/0281* (2013.01); *H04L 63/0471* (2013.01); *H04L 63/20* (2013.01); *H04L 67/02* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 5,835,726 A | 11/1998 | Shwed et al. | |
| 6,324,648 B1 | 11/2001 | Grantges, Jr. | |
| 6,389,462 B1 * | 5/2002 | Cohen | H04L 29/06 707/999.01 |
| 6,510,464 B1 | 1/2003 | Grantges, Jr. | |
| 6,594,682 B2 | 7/2003 | Peterson et al. | |

(Continued)

FOREIGN PATENT DOCUMENTS

EP 2 528 299 A1 11/2012

OTHER PUBLICATIONS

International Preliminary Report on Patentability issued in International Application No. PCT/US14/51154, dated Feb. 25, 2016, 10 pages.

(Continued)

*Primary Examiner* — Trang Doan
(74) *Attorney, Agent, or Firm* — Fish & Richardson P.C.

(57) ABSTRACT

A HTTP request addressed to a first resource on a second device outside the network is received from a first device within the network. The HTTP request is redirected to a third device within the network. A first encrypted connection is established between the first device and the third device, and a second encrypted connection between the third device and the second device. The third device retrieves the first resource from the second device. The first resource is modified to change pointers within the first resource to point to location in a domain associated with the third device within the network. The third device serves, to the first device, the second resource.

27 Claims, 6 Drawing Sheets

(56) References Cited

U.S. PATENT DOCUMENTS

| | | | |
|---|---|---|---|
| 6,742,047 B1 | 5/2004 | Tso | |
| 6,938,171 B1 | 8/2005 | Isomichi et al. | |
| 7,080,158 B1 | 7/2006 | Squire | |
| 7,516,485 B1 | 4/2009 | Lee et al. | |
| 7,606,214 B1 | 10/2009 | Chandra Sekhar et al. | |
| 7,761,594 B1 | 7/2010 | Mowat | |
| 7,793,342 B1 | 9/2010 | Ebrahimi et al. | |
| 7,810,160 B2 | 10/2010 | Dougherty et al. | |
| 7,895,256 B2 | 2/2011 | Zombek et al. | |
| 7,945,779 B2 | 5/2011 | Martin | |
| 8,046,495 B2 | 10/2011 | Cooper et al. | |
| 8,225,085 B2 | 7/2012 | Karandikar | |
| 8,452,956 B1 | 5/2013 | Kersey et al. | |
| 8,533,283 B2* | 9/2013 | Shuster | G06F 17/30867 709/217 |
| 8,561,181 B1 | 10/2013 | Hernacki et al. | |
| 8,615,795 B2 | 12/2013 | Cottrell et al. | |
| 8,739,243 B1 | 5/2014 | Martini | |
| 8,782,277 B2* | 7/2014 | Kulkarni | G06F 17/30887 709/238 |
| 8,903,946 B1* | 12/2014 | Roskind | G06F 17/30902 709/217 |
| 8,949,591 B2 | 2/2015 | Ovsiannikov | |
| 9,015,469 B2 | 4/2015 | Prince et al. | |
| 9,021,085 B1 | 4/2015 | Jensen | |
| 2001/0034791 A1 | 10/2001 | Clubb et al. | |
| 2001/0055285 A1 | 12/2001 | Tomoike | |
| 2002/0010798 A1* | 1/2002 | Ben-Shaul | G06F 17/3089 709/247 |
| 2002/0065938 A1 | 5/2002 | Jungck et al. | |
| 2002/0114453 A1 | 8/2002 | Bartholet et al. | |
| 2002/0178381 A1 | 11/2002 | Lee et al. | |
| 2003/0093691 A1 | 5/2003 | Simon et al. | |
| 2003/0105981 A1 | 6/2003 | Miller et al. | |
| 2003/0131259 A1 | 7/2003 | Barton et al. | |
| 2004/0015725 A1 | 1/2004 | Boneh et al. | |
| 2004/0103318 A1 | 5/2004 | Miller | |
| 2004/0172557 A1 | 9/2004 | Nakae et al. | |
| 2004/0225895 A1* | 11/2004 | Mukherjee | H04L 12/4633 726/15 |
| 2005/0050362 A1* | 3/2005 | Peles | H04L 63/04 726/4 |
| 2005/0149726 A1 | 7/2005 | Joshi | |
| 2006/0036572 A1 | 2/2006 | Kausik | |
| 2006/0056422 A1 | 3/2006 | Berkvens | |
| 2006/0064750 A1* | 3/2006 | Kersey | H04L 63/0428 726/14 |
| 2006/0095422 A1* | 5/2006 | Kikuchi | G06F 17/30899 |
| 2006/0136724 A1 | 6/2006 | Takeshima et al. | |
| 2007/0260871 A1 | 11/2007 | Paya et al. | |
| 2007/0261112 A1 | 11/2007 | Todd et al. | |
| 2007/0289006 A1 | 12/2007 | Ramachandran et al. | |
| 2008/0040790 A1 | 2/2008 | Kuo | |
| 2008/0070573 A1 | 3/2008 | Dutta et al. | |
| 2008/0082662 A1 | 4/2008 | Dandliker et al. | |
| 2008/0126794 A1 | 5/2008 | Wang et al. | |
| 2008/0128495 A1 | 6/2008 | Weintraub et al. | |
| 2008/0163333 A1 | 7/2008 | Kasralikar | |
| 2008/0215877 A1 | 9/2008 | Brabson et al. | |
| 2009/0013399 A1* | 1/2009 | Cottrell | H04L 63/0421 726/12 |
| 2009/0047947 A1 | 2/2009 | Giaretta et al. | |
| 2009/0150972 A1 | 6/2009 | Moon et al. | |
| 2009/0193513 A1 | 7/2009 | Agarwal et al. | |
| 2009/0254990 A1 | 10/2009 | McGee | |
| 2009/0262741 A1* | 10/2009 | Jungck | H04L 29/12066 370/392 |
| 2009/0296657 A1 | 12/2009 | Omar et al. | |
| 2009/0313318 A1 | 12/2009 | Dye | |
| 2010/0138910 A1 | 6/2010 | Aldor et al. | |
| 2010/0146260 A1 | 6/2010 | Levow et al. | |
| 2010/0218248 A1 | 8/2010 | Nice et al. | |
| 2010/0250754 A1 | 9/2010 | Birch et al. | |
| 2010/0313016 A1 | 12/2010 | Zhang et al. | |
| 2011/0083154 A1 | 4/2011 | Boersma | |
| 2011/0154443 A1* | 6/2011 | Thakur | G06F 21/41 726/3 |
| 2011/0208838 A1 | 8/2011 | Thomas et al. | |
| 2011/0231929 A1 | 9/2011 | Rao et al. | |
| 2011/0282997 A1* | 11/2011 | Prince | G06Q 30/0251 709/226 |
| 2011/0302321 A1* | 12/2011 | Vange | G06F 9/5027 709/241 |
| 2012/0124372 A1* | 5/2012 | Dilley | H04L 67/2819 713/162 |
| 2012/0174196 A1* | 7/2012 | Bhogavilli | H04L 63/1458 726/5 |
| 2012/0290829 A1 | 11/2012 | Altman | |
| 2012/0324113 A1* | 12/2012 | Prince | H04L 67/2814 709/226 |
| 2013/0094356 A1 | 4/2013 | Keith et al. | |
| 2013/0117400 A1 | 5/2013 | An et al. | |
| 2013/0223444 A1* | 8/2013 | Liljenstolpe | H04L 61/103 370/392 |
| 2013/0311677 A1* | 11/2013 | Coulson | G06F 17/30887 709/245 |
| 2014/0007222 A1* | 1/2014 | Qureshi | G06F 21/10 726/16 |
| 2014/0123266 A1 | 5/2014 | Carbou | |
| 2014/0143852 A1 | 5/2014 | Cottrell et al. | |
| 2014/0143855 A1 | 5/2014 | Keoh et al. | |
| 2014/0164447 A1* | 6/2014 | Tarafdar | G06F 17/30194 707/827 |
| 2014/0173729 A1 | 6/2014 | Cappos et al. | |
| 2014/0201809 A1 | 7/2014 | Choyi et al. | |
| 2014/0304766 A1 | 10/2014 | Livne | |
| 2015/0039674 A1* | 2/2015 | Agarwal | H04L 67/2842 709/203 |
| 2015/0039756 A1 | 2/2015 | Agarwal | |
| 2015/0319191 A1 | 11/2015 | Georgiev | |

OTHER PUBLICATIONS

Achaiya et al., "MPLS-based Request Routing", Jun. 10, 2001. Downloaded from the internet at: http://www.inf.fu-berlin.de/lehre/SS03/19531—V/lecture9.pdf, dated Apr. 4, 2013, 9 pages.
Big-IP, "BIG-IP ® Solutions Guide, Version 4.2", 2002, downloaded from the internet at http://support.f5.com/content/kb/en-us/archived_products/big-ip/manuals/product/bag42/_jcr_content/pdfAttach/download/file.res/BIG-IP_Controller_Solutions_Guide_version_4.2.pdf on Apr. 4, 2013, 214 pages.
Blue Coat White Paper (How to Gain Visibility and Control of Encrypted SSL Web Sessions), 2007, downloaded from the internet at: http://www.bluecoat.com/sites/default/files/documents/files/How_to_Gain_Visibility_and_Control_of_Encrypted_SSL_Web_Sessions.a.pdf on Dec. 10, 2013, 13 pages.
Burkholder, "SSL Man-in-the-Middle Attacks,"Reading Room SANS, 2002 downloaded from the internet at: http://www.sans.org/reading_room/whitepapers/threats/ssl-man-in-the-middle-attacks_480, on May 16, 2013, 17 pages.
Faruque, "Open Source Open Standard", Sep. 28, 2012, downloaded from the internet at: http://tektab.com/2012/09/28/squib-transparent-proxy-for-https-ssl-traffic/ on Apr. 26, 2013 5 pages.
Glype.com, "Glype Proxy Script", May 2, 2013, downloaded from the internet at http://www.glype.com/ on May 2, 2013, 2 pages.
Molnar, "How to set up OpenDNS for content filtering, visited sites log, etc.," Jun. 22, 2011, downloaded from the internet at: http://www.hotspotsystem.com/hotspot_help/kb/articles/113-how-to-set-up-opends-for-content-filtering-visited-sites-log-etc dated May 3, 2013 7 pages.
Murdoch, et al. "Tools and Technology of Internet Filtering," Dec., 2011, http://oni-access.net/wp-content/uploads/2011/12/accessdenied-chapter-3.pdf, dated May 16, 2013, 16 pages.
Nayak et al. "Different Flavours of Man-In-The-Middle Attack, Consequences and Feasible Solutions", 3rd IEEE International Conference on Computer Science and Information Technology (ICCSIT), Jul. 9-10, 2010, pp. 491-495.

(56) References Cited

OTHER PUBLICATIONS

Portswigger, Ltd. "Burp Proxy Options", Apr. 26, 2013, downloaded from the internet at: http://portswigger.net/burp/help/proxy_options.html#listerners_cert dated Apr. 26, 2013, 4 pages.

Portswigger, Ltd. "Getting Started with Burp Suite", Apr. 26, 2013, downloaded from the internet at: http://portswigger.et/burp/help/suite_gettingstarted.html. dated Apr. 26, 2013, 4 pages.

Proxy.appspot.com, "My Proxy Server", Apr. 26, 2013, downloaded from the internet at: http://mvv-proxy.proxy.appspot.com/ dated Apr. 26, 2013, 1 page.

Rousskov, "Feature: Squid-in-the-middle SSL Bump," Apr. 20, 2012, downloaded from the internet at: http://wiki.squid-cache.org/Features/SslBump dated Apr. 26, 2013, 2 pages.

Ryan, "URL vs URI vs URN: The Confusion Continues", Jan. 18, 2011, downloaded from the internet at: http://damnhandy.com/2011/01/18/url-vs-uri-vs-urn-the-confusion-continues/ dated Dec. 10, 2013, 7 pages.

Security Stack Exchange, "How do I check that I have a direct SSL connection to a website?" May 7, 2012, downloaded from the internet at: http://security.stackexchange.com/questions/14676/how-do-i-check-that-i-have-a-direct-ssl-connection-to-a-website dated Apr. 26, 2013, 2 pages.

vonRandow, "SSL Proxying", Apr. 26, 2013, downloaded from the internet at: http://www.charlesproxy.com/documentation/proxying/ssl-proxying/ dated Apr. 26, 2013, 2 pages.

Websense, Inc., "DNS Proxy Caching", 2011, downloaded from the internet at http://www.websense.com/content/support/library/web/v76/weg_help/dns_proxy_caching.aspx dated Apr. 4, 2013, 2 pages.

Wikipedia, "Proxy server", Apr. 21, 2013, downloaded from the internet at: http://en.wikipedia.org/w/index.php!title=Proxy_server&oldid=551454120 dated Oct. 31, 2014, 12 pages.

International Search Report and Written Opinion issued in International Application No. PCT/US2014/034236, dated Jul. 24, 2014, 11 pages.

International Search Report and Written Opinion issued in International Application No. PCT/US2014/037009, dated Nov. 11, 2014, 10 pages.

* cited by examiner

SELECTIVELY PERFORMING MAN IN THE MIDDLE DECRYPTION

CROSS-REFERENCE TO RELATED APPLICATIONS

This application is a continuation application of and claims priority to U.S. application Ser. No. 13/966,900, filed on Aug. 14, 2013 and issued as U.S. Pat. No. 9,009,461; and to U.S. application Ser. No. 14/682,703, filed on Apr. 9, 2015 and issued as U.S. Pat. No. 9,621,517.

TECHNICAL FIELD

The present document relates to computer networking.

BACKGROUND

A computer network is a collection of computers and other hardware interconnected by communication channels that allow sharing of resources and information. Communication protocols define the rules and data formats for exchanging information in a computer network. A gateway on a network is a node on the network equipped for interfacing with another network or networks. The gateway is often used for passing data between devices on different networks. Transport Layer Security (TLS) and Secure Socket Layer (SSL) are two examples of cryptographic communication protocols that provide communication security by allowing devices to exchange encrypted, as opposed to plaintext, messages.

SUMMARY

In one aspect, a method is performed by data processing apparatus. The method includes receiving, from a first device within the network, a Hypertext Transfer Protocol (HTTP) request addressed to a first resource on a second device outside the network. The method further includes redirecting the HTTP request to a third device within the network. The method further includes establishing a first encrypted connection between the first device and the third device, and a second encrypted connection between the third device and the second device. The method further includes retrieving, by the third device, the first resource from the second device. The method further includes modifying the first resource to change pointers within the first resource to point to location in a domain associated with the third device within the network. The method further includes serving, by the third device to the first device, the second resource.

Implementations can include any, all, or none of the following features. The method including selecting the third device from a plurality of available devices within the network. The third device is selected based on a comparison of the first resource with a rule defining destinations associated with encrypted communication traffic. The third device is selected based on hardware performance. The method includes receiving, from a fourth device within the network, a second HTTP request addressed to an address of a second resource on a fifth device outside the network; routing the HTTP request to the address of the third resource. The method includes modifying the first resource to conform with the security policy. The method includes modifying the first resource includes replacing the resource with a different resource. The method includes modifying the first resource includes replacing HTTP links in the resource with different HTTP links. The method includes modifying the first resource includes replacing the resource with an HTTP status code object. The method includes determining that a security policy of the network identifies the first resource for inspection upon entry to the network.

In one aspect, a computer storage media is encoded with computer program instructions that, when executed by one or more processors, cause a computer device to perform operations. The operations include receiving, from a first device within the network, a Hypertext Transfer Protocol (HTTP) request addressed to a first resource on a second device outside the network. The operations further include redirecting the HTTP request to a third device within the network. The operations further include establishing a first encrypted connection between the first device and the third device, and a second encrypted connection between the third device and the second device. The operations further include retrieving, by the third device, the first resource from the second device. The operations further include modifying the first resource to change pointers within the first resource to point to location in a domain associated with the third device within the network. The operations further include serving, by the third device to the first device, the second resource.

Implementations can include any, all, or none of the following features. The operations further include selecting the third device from a plurality of available devices within the network. The third device is selected based on a comparison of the first resource with a rule defining destinations associated with encrypted communication traffic. The third device is selected based on hardware performance. The computer operations further include receiving, from a fourth device within the network, a second HTTP request addressed to an address of a second resource on a fifth device outside the network; routing the HTTP request to the address of the third resource. The operations further include modifying the first resource to conform with the security policy. The operations further include modifying the first resource includes replacing the resource with a different resource. The operations further include modifying the first resource includes replacing HTTP links in the resource with different HTTP links. The computer operations further include modifying the first resource includes replacing the resource with an HTTP status code object. The operations further include determining that a security policy of the network identifies the first resource for inspection upon entry to the network.

In one aspect, a system includes one or more processors configured to execute computer program instructions. The system further includes computer storage media encoded with computer program instructions that, when executed by one or more processors, cause a computer device to perform operations. The operations include receiving, from a first device within the network, a Hypertext Transfer Protocol (HTTP) request addressed to a first resource on a second device outside the network. The operations further include redirecting the HTTP request to a third device within the network. The operations further include establishing a first encrypted connection between the first device and the third device, and a second encrypted connection between the third device and the second device. The operations further include retrieving, by the third device, the first resource from the second device. The operations further include modifying the first resource to change pointers within the first resource to point to location in a domain associated with the third device within the network. The operations further include serving, by the third device to the first device, the second resource.

Implementations can include any, all, or none of the following features. The operations further include selecting the third device from a plurality of available devices within the network. The third device is selected based on a comparison of the first resource with a rule defining destinations associated with encrypted communication traffic. The third device is selected based on hardware performance. The computer operations further include receiving, from a fourth device within the network, a second HTTP request addressed to an address of a second resource on a fifth device outside the network; routing the HTTP request to the address of the third resource. The operations further include modifying the first resource to conform with the security policy. The operations further include modifying the first resource includes replacing the resource with a different resource. The operations further include modifying the first resource includes replacing HTTP links in the resource with different HTTP links. The computer operations further include modifying the first resource includes replacing the resource with an HTTP status code object. The operations further include determining that a security policy of the network identifies the first resource for inspection upon entry to the network.

The systems and processes described here may be used to provide a number of potential advantages. A gateway can decouple domains from shared Internet Protocol (IP) addresses and selectively choose to intercept SSL, TLS, etc requests. If spoofed IP addresses are another server on the network, performance issues may be alleviated as only selective requests are sent to man in the middle (MitM) gateways for decryption. Cryptographically protected traffic can be inspected at network egress and ingress, allowing a network administrator to enforce security policies consistently across both cryptographically protected traffic and plaintext traffic. By using standard communication protocols, browser devices (e.g. cell phones, tablets, laptops) can join the network with little or no special configuration.

DESCRIPTION OF DRAWINGS

Like reference symbols in the various drawings indicate like elements

DETAILED DESCRIPTION

When data on a network is encrypted (e.g., by SSL or TSL) the data can pose challenges to network security appliances and routines in that it makes it difficult to inspect the data as it is transferred between the end users and servers on the Internet. This can lead to problems such as viruses being transferred over secure connections and entering the network instead of being blocked because the gateway security appliances could not inspect the data. In addition, organizational policies cannot be applied since the data within the encrypted traffic is protected causing security functions to fail as they cannot inspect the data.

Described in this document is a use of man in the middle decryption based on rules indicating which destinations should be decrypted and which should be passed directly to the Internet destination. A network gateway maps specific spoofed IP addresses to correlated domain in order to, among other uses, determine which encrypted connections should by bypassed and sent directly to the Internet destination and which connections should be decrypted using a man in the middle technique.

A computer network typically has one or more gateways that allow communication between devices on the network and devices on other networks (e.g. the Internet). One such gateway can be a network gateway that routes plaintext (i.e., non-encrypted) traffic among devices within the network and devices outside of the network. One common type of plaintext traffic that is routed through a network gateway is a request message (e.g., Hypertext Transfer Protocol's GET and POST, Post Office Protocol's RETR), which is a request to a server for a resource on the server.

Instead of passing all request messages to the server, the network gateway can intercept some of the request messages if the network gateway determines that traffic between the network devices and the URLs or URIs will be encrypted. For these request messages, the network gateway can respond to the network device with the address or addresses of one or more man in the middle (MitM) gateways in the network. The MitM gateways may then act as man in the middle proxies for the resource at the URL or URI, allowing cryptographically secure communication that can be inspected when entering or exiting the network.

Figure 1A:
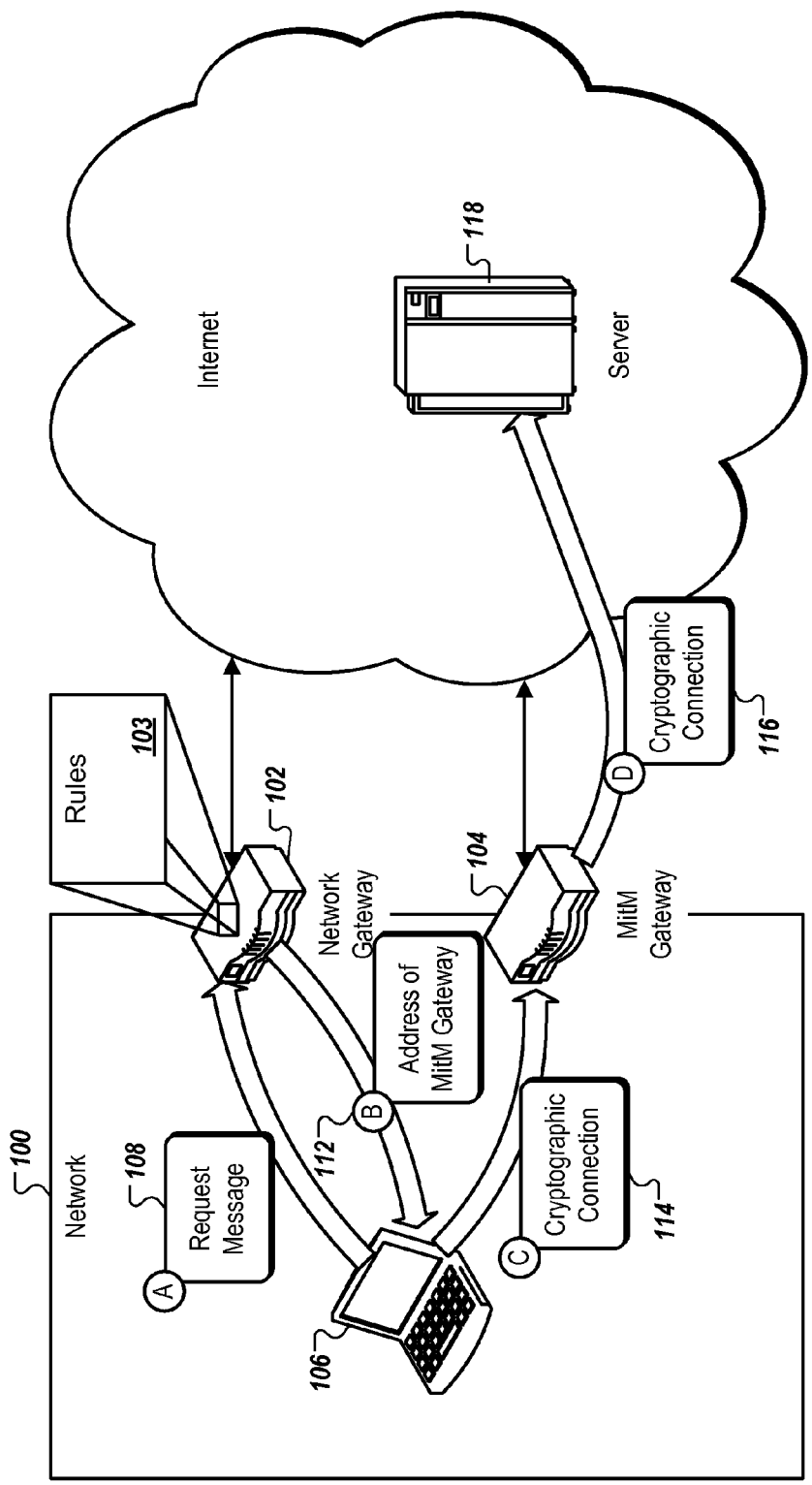
FIG. 1A is a block diagram of a network with a network gateway and a man in the middle gateway.

FIG. 1A is a block diagram of a network 100 with a network gateway 102 and a MitM gateway 104. Also shown in the network 100 is a browser device 106, which represents any appropriate computing device capable of browsing resources outside of the network 100. While not shown for clarity's sake, the network 100 can include other elements including, but not limited to, wireless and/or wired access points, file and/or application servers, routers, and network cables, as well as additional browser devices 106, network gateways 102, and/or MitM gateways 104.

The network 100 can be configured to route some or all of the plaintext messages addressed outside the network to the network gateway 102. The network gateway 102 can inspect the plaintext messages and, optionally, modify or drop some messages. For example, the network gateway 102 may be configured to prevent traffic from a particular class of application (e.g., chat, files sharing). The network gateway 102 may also be configured to intercept messages intended for a recipient outside of the network 100 and reply directly. This process is sometimes referred to as spoofing.

For example, the network gateway may intercept and examine a request message 108 from the browser device 106 that is addressed to a server 118. Based on, for example, the URL or URI in the request message 108 and rules 103 indicating which destination should be decrypted and which should be passed directly to the Internet destination, the network gateway 102 may determine that, instead of passing the request message 108 to the server 118, the network gateway 102 should respond to the request message with a MitM gateway address 112 in, for example, a redirect message to the browser device 106. The network gateway 102 may be configured to make this determination so that encrypted communication from the browser device 106 first passes through the MitM gateway 104, thereby allowing the gateway 104 to decrypt the communication and perform man in the middle data inspection before allowing the communication to pass out of the network 100. The network gateway 102 may make the determining to pass encrypted communication through the MitM gateway 104 based on security policies or concerns as applied to the network 100. While passing communication through the MitM 104 may provide some other benefits (e.g., caching of frequently visited resources to reduce bandwidth usages), the rules 103 may be configured to primarily or exclusively account for the security considerations of passing communications through the network gateway 102 or the MitM gateway 104.

The browser device 106, upon receiving the MitM gateway address 112, can initialize a cryptographic connection 114 with the MitM gateway 104 at the MitM gateway address 112. The cryptographic connection 114 may be an SSL, TLS, or any other appropriate cryptographic session. The MitM gateway 104 may then initialize another cryptographic connection 116 with the server 118 that hosts the resource identified by the URL or URI of the DNS request 108.

Once the cryptographic connections 114 and 116 are established, the browser device 106 and the server 118 may communicate with each other. In this communication, the MitM gateway 104 may act as a proxy of the server 118 for the browser device 106 and as a proxy of the browser device 106 for the server 118. The MitM gateway 104 is thus able to receive an encrypted message from the browser device 106, decrypt the message, inspect the message, optionally alter or drop the message, encrypt the possibly altered message into a second encrypted form, and pass the message to the server 118. The MitM gateway 104 may perform the same type of reception, decryption, inspection, alteration or drop, encryption, and passage with messages from the server 118 to the browser device 106. The MitM gateway 104 may sometimes be referred to by other terms including, but not limited to, a reverse proxy, intercepting proxy, accelerator, accelerating proxy, and transparent proxy.

One type of alteration that may be made by the MitM gateway 104 is to alter the URLs and URIs of webpages served by the server 118. For example, the server 118 may serve a webpage with a number of links to other webpages on the same website. The MitM gateway 104 may replace those URLs and URIs that are similar to the original URLs and URIs but which to the MitM gateway 104.

For clarity of description, here and elsewhere, variable names are enclosed in square brackets. In one example, the server 118 may serve a webpage with the URL www.[exampleEncryptedPage].com, and this webpage may have links to www.[exampleEncryptedPage].com/medai.html and www.[exampleEncryptedPage].come/links.html. The MitM gateway 104 may replace those links with www.[MitMGateway].com/[exampleEncryptedPage]/media and with www.[MitMGateway].com/[exampleEncryptedPage]/links, or with [exampleEncryptedPage].[MitMGateway].com/media and [exampleEncryptedPage.MitMGateway].com/links. In this example, the ULR www.[MitMGateway].com can be configured to resolve to an IP address of the MitM Gateway 104. For clarity of description, here and elsewhere, variable names are enclosed in square brackets.

The inspection, alteration, and dropping performed by the MitM gateway 104 can allow the MitM gateway 104 to ensure that encrypted communication into and out of the network conforms to any number of policies. For example, the network 100 may have a policy of inspecting incoming messages for computer viruses, malware, or other unwanted content. The network gateway 102, handling plaintext messages, can inspect the payloads of the messages and drop any messages that match viral signatures, malware black-lists, etc. The MitM gateway 104 may apply the same policy, inspecting incoming messages in their decrypted state and drop any messages that fail the same tests as applied by the network gateway 102.

In some examples, the request message 108 may transmitted be in the clear. That is, the request message 108 may be in a cleartext form conforming to the HTTP specification. The address of the MitM gateway 112 may specify a secure connection. That is, the address of the MitM gateway 112 may specify that the browser device 106 should connect by HTTP Secure ("HTTPS"). This may be beneficial, for example, for ensuring that all content requested and served from the server 118 is encrypted, even if the server 118 does not enforce an encrypted-only policy.

Figure 1B:
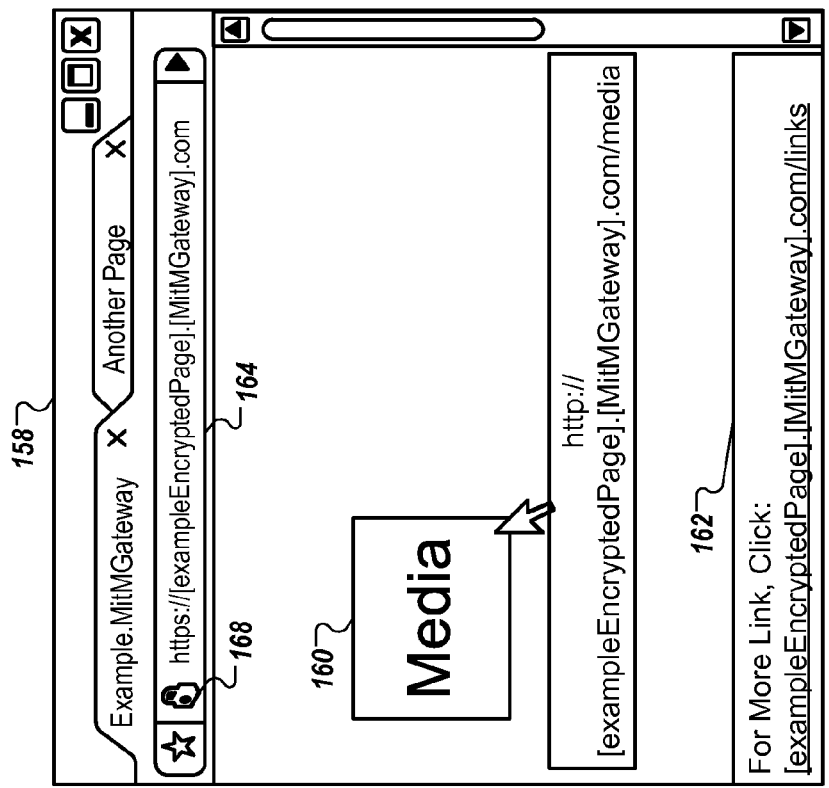
FIG. 1B is a diagram of a webpage that has been modified.
Figure 1B:
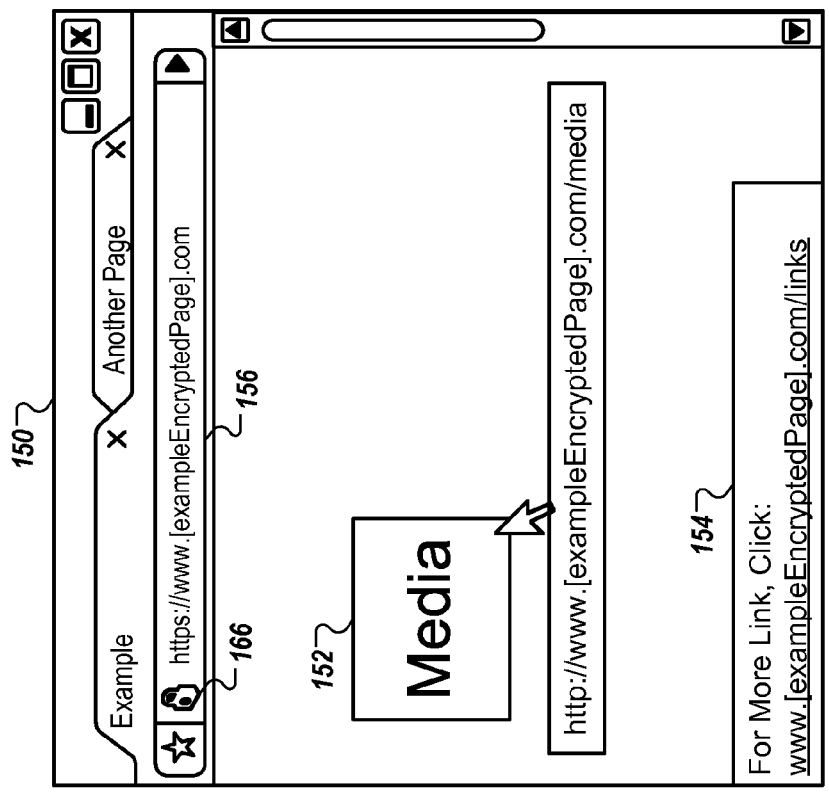

FIG. 1B is a diagram of a webpage that has been modified. Original webpage 150 is a rendered webpage that may be served by, for example, the server 118. The original webpage 150 can include pointers to other webpages such an image 152 with an embedded link, and a text link 154. The original webpage is located at the URL 156 http://www.[exampleEncryptedPage.]com.

Modified webpage 158 is a rendered webpage that has been created by modifying the original webpage 150. For example, the MitM gateway 104 may receive the original webpage 150 from the server 118 and modify the original webpage 150 to create the modified webpage 158.

The modified webpage 158 contains an image 160 that corresponds to the image 152 and a text link 162 that corresponds to the text link 154. However, the embedded link of image 160 and the text link 162 have been modified to address of a domain associated with the MitM gateway 104. Similarly, the URL 164 of the webpage 158 has been modified from the URL 156. With these substitutions, the webpage 158 may be rendered to include links to the [MitMGateway] domain instead of the [exampleEncryptedPage] domain. In some cases, in addition to updating the anchor property link, the text of the text link 162 may be updated to indicate the [MitMGateway]. In some cases, the text of the link 162 may be unmodified while the anchor property link may be updated to point to the [MitMGateway]

In this example, the browser displays a lock icon 166 and 168 with the original webpage 150 and the modified webpage 158. A web browser may be configured, for example, to display lock icons 166 and 168 when a webpage with trusted encryption is being rendered. In the case of the original webpage 150, the encrypted connection can be considered trusted if an encrypted connection to the server 118 is trusted. In the case of the modified webpage 158, the encrypted connection can be considered trusted if an encrypted connection to the MitM gateway 104 is trusted.

As shown here, URLs and URIs are replaced in the modified webpage 158 by inserting "[MitMGatway]." before the top level domain portion of URLs and URIs in the original webpage 150. However, other forms of address modification are possible.

For example, elements of addresses in the original webpage 150 may be used as parameters in addresses in the modified webpage 158. In this example, the image 160 may have an embedded link to www.[MitMDomain].com/orig_url="www.[exampleEncryptedPage].com/media", and the text link 162 may be to www.[MitMDomain].com/orig_url="www.[exampleEncryptedPage].com/links".

Figure 2:
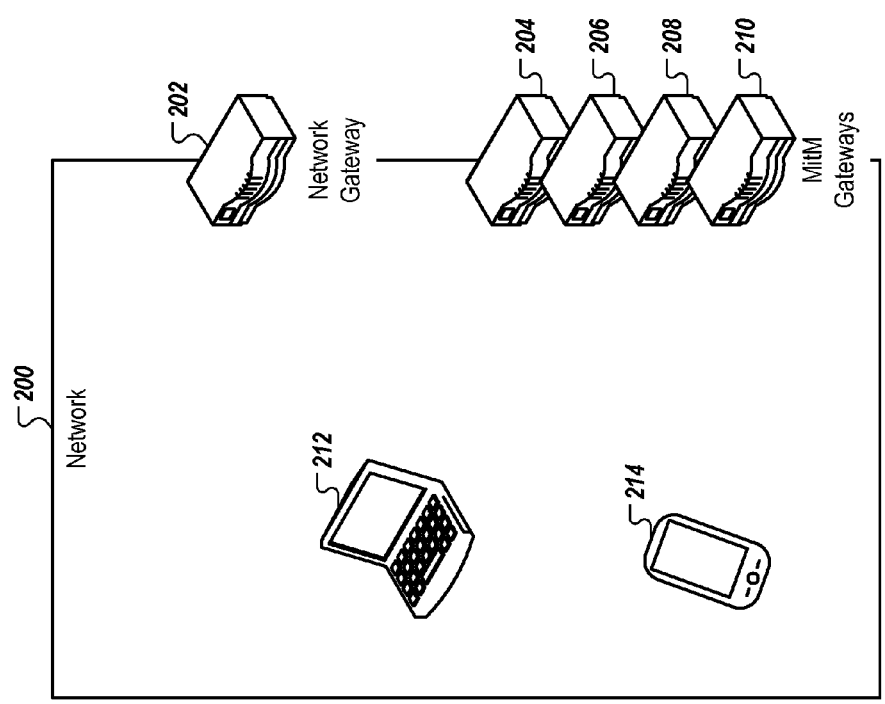
FIG. 2 is a block diagram of a network with a network gateway and a group of man in the middle gateways.

FIG. 2 is a block diagram of a network 200 with a network gateway 202 and a group of MitM gateways 204-210. The network 200 can be configured to route some or all of the plaintext messages addressed outside the network to the network gateway 202. The network gateway 202 can inspect the plaintext messages and, optionally, modify or drop a message. The network gateway 202 may also be configured to intercept and examine a request message from browser devices 212 and 214 and respond directly with the address or addresses of one or more of the MitM gateways 204-210, for example, in a HTTP redirect message.

In general, decryption and encryption of network data may be a computationally intensive task for network appliances such as gateways. To alleviate performance issues, and for other reasons, the network gateway 202 and the group of MitM gateways 204-210 may be used to share or balance the load of the MitM gateways 204-210. The network gateway 202 may respond to a request message from a browser device 212 or 214 with address of all available MitM gateways 204-210 in the network 200. The browser devices 212 or 214 may then initiate a cryptographic connection with one the MitM gateway 204-210 in order to attempt to reach the resource specified in the DNS request.

The network gateway 202 may be configured to provide the addresses of the MitM gateways 204-210 in any appropriate scheme, for example, in any way that is permitted by a redirect protocol. In one example, the network gateway 202 may always respond with the addresses in the same order. In another example, the network gateway 202 may rotate the order of addresses. The browser devices 212 and 214 may be configured to select one address from the group of returned addresses in any appropriate scheme, for example, in any way that is permitted by the redirect protocol. In one example, the browser devices 212 and 214 may pseudorandomly select one of the addresses. In another example, the browser devices 212 and 214 cache a ping time every time an address is connected with, and the browser devices 212 and 214 may select the returned address associated with the lowest ping time.

In some cases, the network gateway 202 and the group of MitM gateways 204-210 may be used to route different classes of traffic to different MitM gateways 204-210. This may be desirable, for example, if policies of the network 200 specify that different policy tests should apply to different classes of encrypted traffic.

In one example, the MitM gateway 204 may be configured to handle encrypted traffic that is generally unrestricted. That is, the encrypted traffic may not be inspected, modified, or dropped at all, or may be only minimally inspected (e.g., encrypted VPN (Virtual Private Network) traffic to and from a network at a branch office). For another class of traffic, the network administrator may wish to inspect only incoming traffic for virus, malware, or other malicious code (e.g., encrypted traffic to banking or financial institutions). For a third class of traffic, the network administrator may wish to inspect outgoing traffic to make sure secret or proprietary data is not being transmitted and inspect incoming traffic for malicious code (e.g., social networking and hosted storage sites). For a fourth class of data, a hosted application provider may share the same IPs for some services that should be permitted and for some services that should be blocked (e.g., an application provider hosts email and document sharing, which should be allowed, as well as media streaming, which should be blocked).

In this example, the MitM gateways 204-210 can be configured as follows:

| | |
|---|---|
| MitM gateway 204 | Perform no inspection of data. |
| MitM gateway 206 | Inspect and drop incoming data that contains malicious code. |
| MitM gateway 208 | Inspect and drop incoming data that contains malicious code. Inspect and drop outgoing data that contains secret or proprietary data. |
| MitM gateway 210 | Inspect and drop incoming data that contains malicious code. Determine which service the data is associated with, dropping any related to blocked services. |

To route traffic from the browser devices 212 and 214, the network gateway 202 may inspect received request message and determine which of the MitM gateways 204-210 should handle the encrypted traffic. For example, the network gateway 202 may have a list that maps URLs and URIs to categories based on the type of content available at the URL or URI. When the network gateway 202 receives a request message, the network gateway 202 can compare the URL or URI of the DNS request to the list. If the request's URL or URI is not on the list, the network gateway 202 can pass the request message to the specified server for resolution. If the URL or URI is on the list, the network gateway 202 can respond to the requesting browser device 212 or 214 with the address of one of the MitM gateways 204-210 configured to handle traffic associated with the category that the URL or URI falls under.

Two browser devices 212 and 214 are shown in FIG. 2, however, these browser devices and other browser devices can enter and exit the network 200 over time. For example, a worker may bring one or more of her employer's or her own devices (e.g., laptop, phone, tablet) into the network 200 at the start of the day and remove the devices at the end when she goes home. Other than the configurations need to join the network (e.g. Wi-Fi passwords, plugging in Ethernet cords), the network 200 need not require any special configuration to ensure that encrypted traffic is routed through the correct MitM gateways 204-210 due to the fact that all messages to and from the browser devices conform to standards that are commonly supported on many common hardware, operating system, and browser systems.

Figure 3:
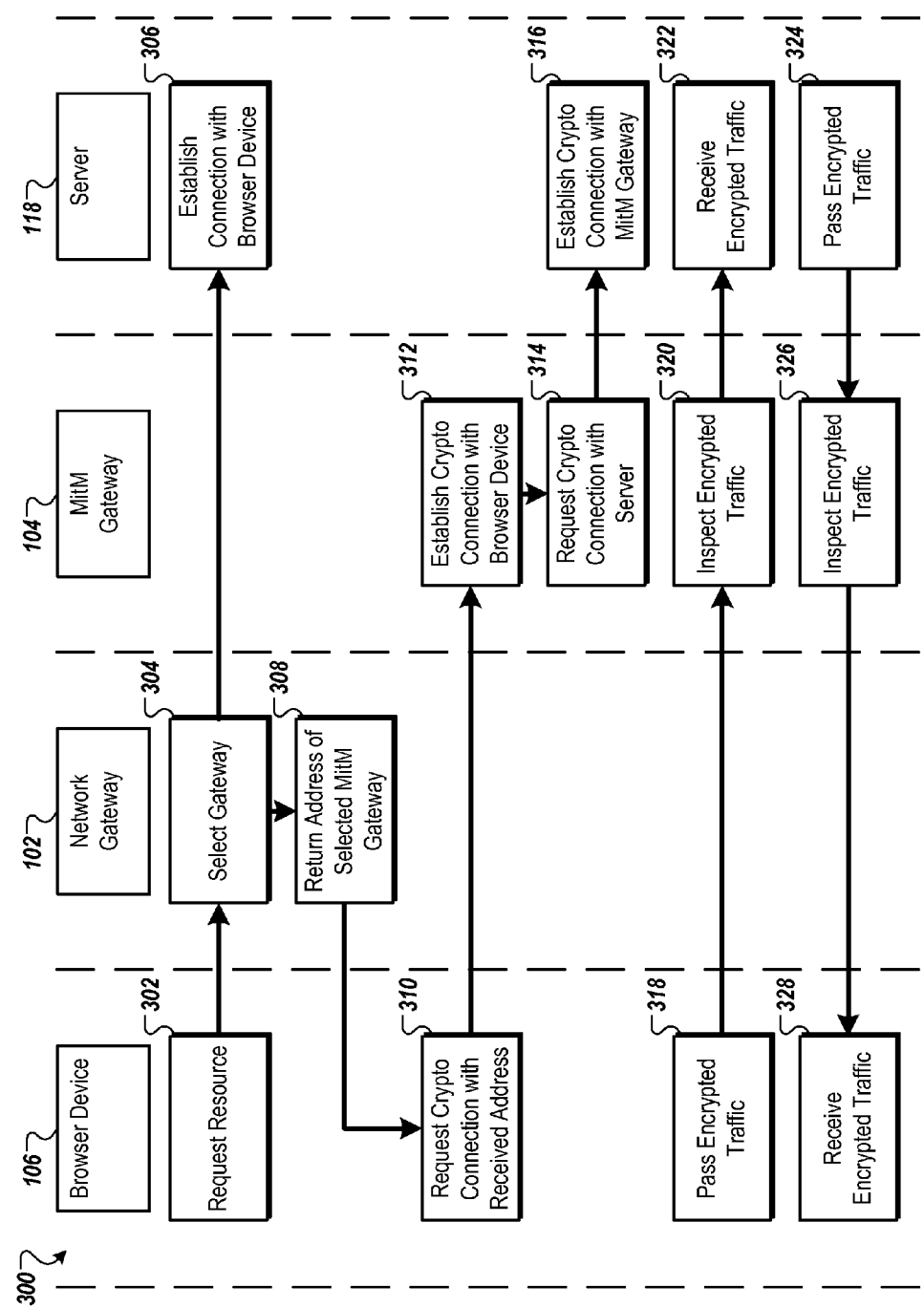
FIG. 3 is a swim-lane diagram of an example process for establishing a communication link through a man in the middle gateway.

FIG. 3 is a swim-lane diagram of an example process 300 for establishing a communication link through a MitM gateway. The process 300 is described with reference to the components shown in FIG. 1A. However, other components, including and not limited to the components shown in FIG. 2, can be used to perform the process 300 or a similar process.

The browser device 106 creates a request message for a resource (302). For example, a user may request to download, from a hosted storage system, a data object identified by a unique URI. The browser device can create a request message that includes the data object's URI and send the request message to the network gateway 102.

The network gateway 102 receives the request and selects a gateway to be used for traffic associated with the website address (304). For example, the network gateway 102 can process a set of rules 103 that indicate which destination should be decrypted and which should be passed directly to the Internet destination. These rules 103 may include, for example, a list of URLs, URIs, domain names and IP address mapped to security policies, content classifications, or directions for handling of network traffic (e.g., specifying that the traffic should be decrypted and inspected). If the network gateway 102 selects the network gateway 102 for the traffic to pass directly to the Internet destination, the browser device 106 and the server 118 establish a connection through the network gateway 102 (306). For example, if the network gateway 102 determines that the browser device 106 is likely to start an unencrypted communication session with the hosted storage system, the network gateway 102 can pass the request message to the server 118 (see FIG. 1A) and permit the browser device 106 to create an unencrypted connection with the server 118.

If the network gateway 102 selects the MitM gateway 104, the network gateway 102 returns the address of the selected MitM gateway 104 (308). For example, the network gateway 102 may have a record of past connections with the hosted storage system and determine that the hosted storage system usually communicates through encrypted communication channels. In such a case, the network gateway 102 may select the MitM gateway 104 for the communication between the browser device 106 and the server 118 and thus may return a redirect to the network address of the MitM gateway 104 to the browser device 106 Many types of redirection are possible, including but not limited to server-side scripting, frame redirects, and Apache $mod_{13}$ rewrite. Regardless of the redirection used, the redirection can include sufficient information for the MitM gateway 104 to identify the originally requested content.

The browser device 106 requests an encrypted connection with the device at the received address, which is the MitM gateway 104 (310). For example, the browser device 106 may send to the MitM gateway 104 an SSL Hello or other encryption handshake message. In another example, the MitM gateway 104 may have multiple network addresses, each associated with known destination URLs. When a connection request is received at one of the multiple addresses, the MitM gateway 104 may look up the associated URL. The browser device 106 and the MitM gateway 104 establish a first encrypted connection (312). For example, the MitM gateway 104 may act as a proxy of the server 118, mimicking the interface of the server 118 in communications with the browser device 106.

The MitM gateway 104 requests an encrypted connection with the server 118 (314). For example, the MitM gateway 104 can request an encrypted connection on behalf of the browser device 106. The MitM gateway 104 and the server 118 establish a second encrypted connection (316). For example, the MitM gateway 104 may act as a proxy of the browser device 106, mimicking the interface of the browser device 106 in communications with the server 118. The two encryption sessions may be of the same or different formats or types.

The browser device 106 generates traffic, encrypts the traffic into a first encrypted form, and passes the traffic to the MitM gateway 104 (318). For example, the browser device can create a HTTP Get request for the data object. The browser device can encrypt the HTTP Get request according to the requirements of the encrypted connection with the MitM gateway 104 and pass the encrypted HTTP Get request to the MitM gateway 104.

The MitM gateway 104 receives the traffic, decrypts the traffic, inspects the traffic, encrypts the traffic into a second encrypted form, and passes the traffic to the server 118 (320). For example, the MitM gateway 104 can decrypt the encrypted message into plaintext and determine that the message is an HTTP Get request. The MitM gateway 104 can compare the HTTP Get request with the rules of any policies that apply to traffic out of the network 100. If the HTTP Get request does not violate any policy, the MitM gateway 104 can encrypt the HTTP Get request according to the requirements of the encrypted connection with the server 118 and pass the encrypted HTTP Get request to the server 118. If the HTTP Get request does violate a policy, the MitM gateway 104 can modify or drop the request, as specified by the policy.

The server 118 receives the traffic in the second encrypted form (322). For example, the server 118 may receive the encrypted HTTP Get request, decrypt the HTTP Get request, and determine that the user of the browser device 106 has authorization to access the requested data object.

The server 118 generates traffic, encrypts the traffic into a third encrypted form, and passes the traffic to the MitM gateway 104 (324). For example, the server 118 can access the requested data object, format the data object into HTML or other appropriate format, and add the HTML object to an HTTP reply. The server 118 can encrypt the HTTP reply according to the requirements of the encrypted connection with the MitM gateway 104 and pass the encrypted HTTP reply to the MitM gateway 104

The MitM gateway 104 receives the traffic, decrypts the traffic, inspects the traffic, encrypts the traffic into a fourth form, and passes the traffic to the browser device 106 (326). For example, the MitM gateway 104 can decrypt the encrypted message into plaintext and determine that the message is an HTTP reply. The MitM gateway 104 can compare the HTTP reply with the rules of any policies that apply to traffic into the network 100. If the HTTP reply does not violate any policy, the MitM gateway 104 can modify the HTML object to replace addresses of the server with address of the MitM Gateway 104, encrypt the HTTP reply according to the requirements of the encrypted connection with the browser device 106 and pass the encrypted HTTP reply to the browser device 106. If the HTTP reply does violate a policy (e.g., contains malicious code, too large), the MitM gateway 104 can modify or drop the reply, as specified by the policy.

The browser device 106 receives the encrypted traffic (328). For example the browser device can decrypt the HTTP reply, extract the modified HTML object, and render the modified HTML object in a web browser.

Although a particular number, type, and order of operations are shown here, other numbers, types, and orders of operations are possible. For example, if there are multiple MitM gateways available, the network gateway 102 may select one or more and return the addresses of selected MitM gateways. In another example, the browser device 106 and the server 118 may create and pass encrypted traffic in the opposite order shown here or substantially at the same time.

Figure 4:
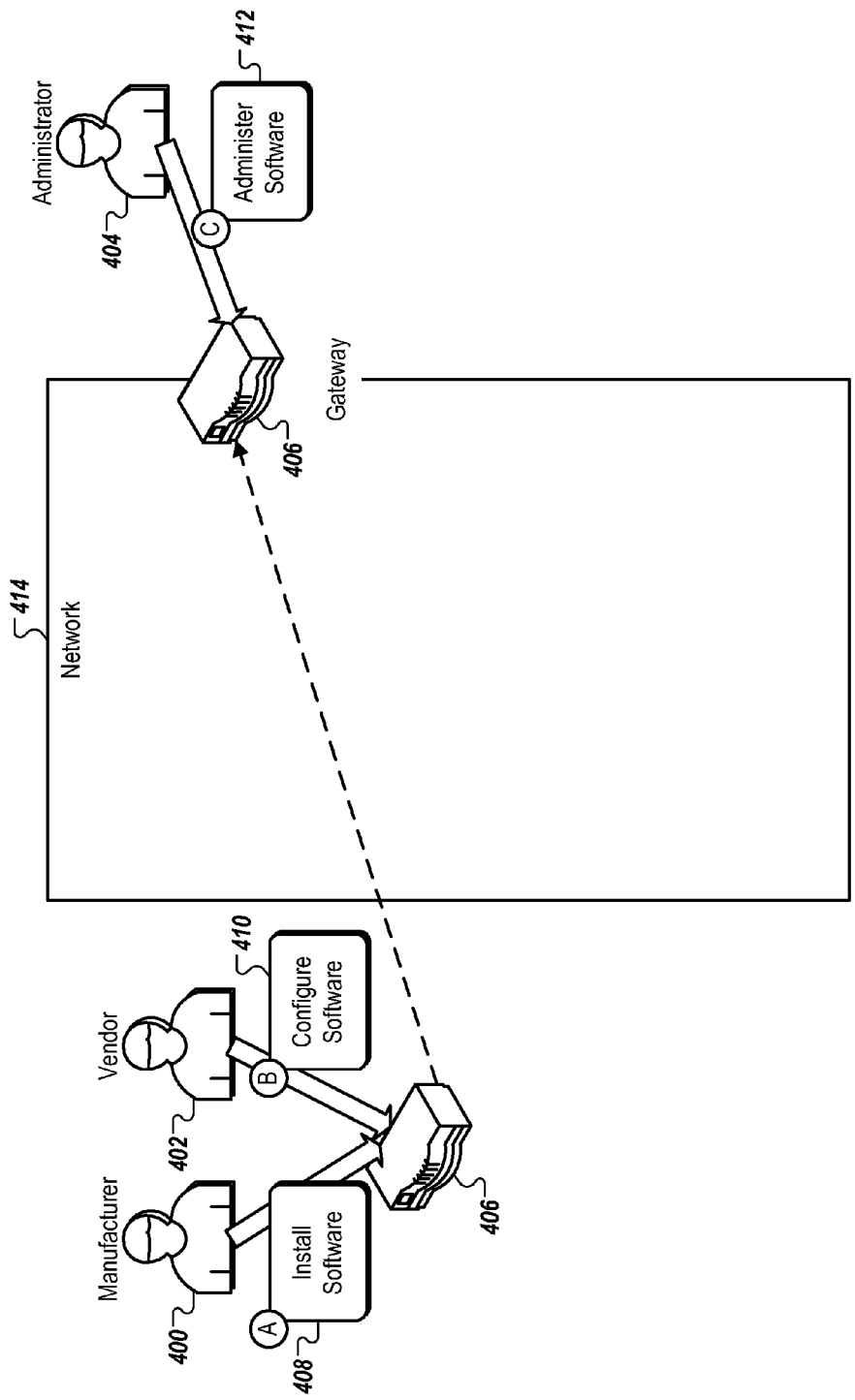
FIG. 4 is a block diagram showing example users responsible for a gateway.

FIG. 4 is a block diagram showing example users responsible for a gateway. The users will be described according to their responsibilities for manufacturing, selling, and administering a gateway. In some cases, each of the users shown corresponds to many users, and/or some users may be responsible for more than on task described.

A manufacturer 400 is responsible for designing, assembling, and installing software 408 on a gateway 406. The installed software may have many configurable options, including options to configure the gateway 406 to behave as a network gateway 102 or 202 and/or as a MitM gateway 104 or 204-210.

A vendor 402 is responsible for selling the gateway 406 to a customer. The vendor 402 may be able to configure the software 410 of the gateway 406 to behave as a network gateway 102 or 202 and/or as a MitM gateway 104 or 204-210. In some cases, the vendor 402 may replace the software that the manufacturer 400 installed on the gateway 406 as part of configuring the gateway 406.

An administrator 404 is responsible for administering the network 414, which may include the gateway 406. In some cases, the administrator 404 is able to configure the software 410 of the gateway 406 to behave as a network gateway 102 or 202 and/or as a MitM gateway 104 or 204-210. In some cases, the administrator 404 may replace the software that the manufacturer 400 or vendor 402 installed on the gateway 406 as part of configuring the gateway 406.

Figure 5:
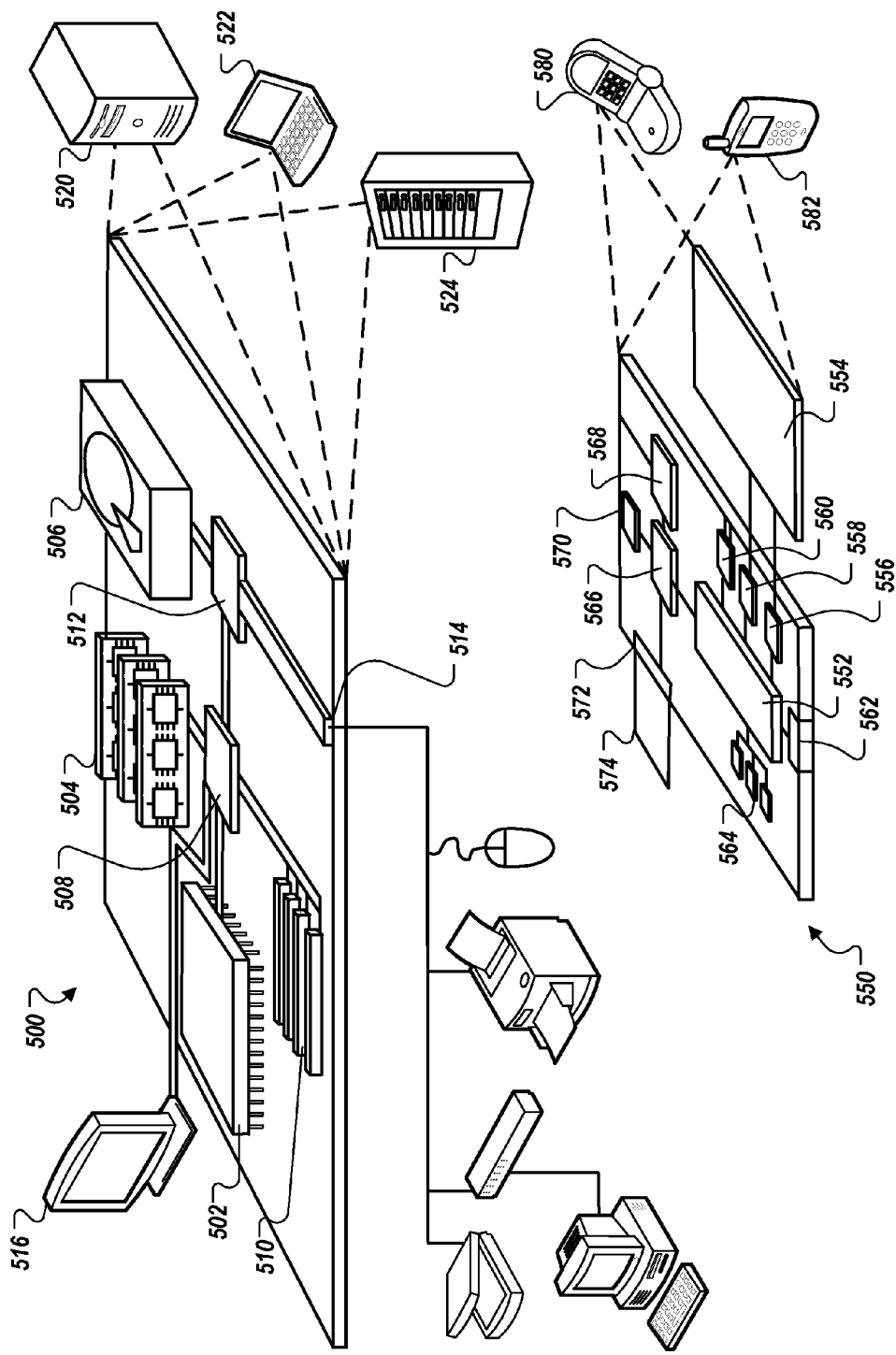
FIG. 5 is a schematic diagram that shows an example of a computing device and a mobile computing device.

FIG. 5 shows an example of a computing device 500 and an example of a mobile computing device that can be used to implement the techniques described here. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:
1. A method performed by data processing apparatus, the method comprising:
   selecting a proxy server from a plurality of proxy servers identifying a proxy server that is i) connected to a client device via a local area network (LAN), ii) connected to the Internet, and iii) assigned an address in a domain that is associated with the LAN, wherein the LAN is configured to route messages to the proxy server if the messages are addressed to the domain associated with the LAN based on analysis of network traffic from the client;

redirecting, to the selected proxy server, a Hypertext Transfer Protocol (HTTP) request from the client device, wherein the HTTP request is addressed to a resource on an external server, wherein the proxy server is connected to the client device via the LAN and wherein the proxy server is connected to the external server via the Internet;

retrieving, by the proxy server, the resource from the external server;

modifying the resource to change pointers within the resource to point to locations in the domain that is associated with the LAN proxy server and associated with the network; and transmitting, by the proxy server, the modified resource to the client device;

receiving, by the proxy server, a second request that is from the client device and addressed with one of the changed pointers of the modified resource which is addressed to the domain associated with the LAN;

identifying a second resource on the external server;

retrieving, by the proxy server, the second resource from the external server;

modifying the second resource to change pointers within the resource to point to a location in the domain that is associated with the LAN; and transmitting, by the proxy server, the modified second resource to the client device.

2. The method of claim 1, wherein redirecting the HTTP request includes:
intercepting the HTTP request; and
responding to the HTTP request with an HTTP redirect message that includes an address of the proxy server.

3. The method of claim 1, wherein redirecting the HTTP request includes:
intercepting a domain name service (DNS) request associated with the HTTP request; and
responding to the DNS request associated with the HTTP request with a DNS response that includes an address of the proxy server.

4. The method of claim 1, wherein the client device is configured to display at least one changed pointer to a user of the client device.

5. The method of claim 1, wherein modifying the resource is performed based at least in part on a security policy.

6. The method of claim 1, wherein modifying the resource includes replacing the resource with a different resource.

7. The method of claim 1, wherein modifying the resource includes replacing HTTP links in the resource with different HTTP links pointing to locations in the domain associated with the proxy server.

8. The method of claim 1, wherein modifying the resource includes replacing the resource with an HTTP status code object.

9. The method of claim 1, further comprising:
determining that a security policy of the network identifies the resource for inspection upon entry to the network; and
in response to determining that the security policy of the network identifies the resource for inspection, inspecting the resource.

10. A non-transitory computer storage media encoded with computer program instructions that, when executed by one or more processors, cause a computer device to perform operations comprising:
selecting a proxy server from a plurality of proxy servers identifying a proxy server that is i) connected to a client device via a local area network (LAN), ii) connected to the Internet, and iii) assigned an address in a domain that is associated with the LAN, wherein the LAN is configured to route messages to the proxy server if the messages are addressed to the domain associated with the LAN based on analysis of network traffic from the client;

redirecting, to the selected proxy server, a Hypertext Transfer Protocol (HTTP) request from the client device, wherein the HTTP request is addressed to a resource on an external server, wherein the proxy server is connected to the client device via the LAN and wherein the proxy server is connected to the external server via the Internet;

retrieving, by the proxy server, the resource from the external server;

modifying the resource to change pointers within the resource to point to locations in the domain that is associated with the LAN proxy server and associated with the network; and transmitting, by the proxy server, the modified resource to the client device;

receiving, by the proxy server, a second request that is from the client device and addressed with one of the changed pointers of the modified resource which is addressed to the domain associated with the LAN;

identifying a second resource on the external server;

retrieving, by the proxy server, the second resource from the external server;

modifying the second resource to change pointers within the resource to point to a location in the domain that is associated with the LAN; and transmitting, by the proxy server, the modified second resource to the client device.

11. The non-transitory computer storage media of claim 10, wherein redirecting the HTTP request includes:
intercepting the HTTP request; and
responding to the HTTP request with an HTTP redirect message that includes an address of the proxy server.

12. The non-transitory computer storage media of claim 10, wherein redirecting the HTTP request includes:
intercepting a domain name service (DNS) request associated with the HTTP request; and
responding to the DNS request associated with the HTTP request with a DNS response that includes an address of the proxy server.

13. The non-transitory computer storage media of claim 10, wherein the client device is configured to display at least one changed pointer to a user of the client device.

14. The non-transitory computer storage media of claim 10, wherein modifying the resource is performed based at least in part on a security policy.

15. The non-transitory computer storage media of claim 10, wherein modifying the resource includes replacing the resource with a different resource.

16. The non-transitory computer storage media of claim 10, wherein modifying the resource includes replacing HTTP links in the resource with different HTTP links pointing to locations in the domain associated with the proxy server.

17. The non-transitory computer storage media of claim 10, wherein modifying the resource includes replacing the resource with an HTTP status code object.

18. The non-transitory computer storage media of claim 10, further comprising:
  determining that a security policy of the network identifies the resource for inspection upon entry to the network; and
  in response to determining that the security policy of the network identifies the resource for inspection, inspecting the resource.

19. A system comprising:
  one or more processors configured to execute computer program instructions; and
  non-transitory computer storage media encoded with computer program instructions that, when executed by one or more processors, cause a computer device to perform operations comprising:
    selecting a proxy server from a plurality of proxy servers identifying a proxy server that is i) connected to a client device via a local area network (LAN), ii) connected to the Internet, and iii) assigned an address in a domain that is associated with the LAN, wherein the LAN is configured to route messages to the proxy server if the messages are addressed to the domain associated with the LAN based on analysis of network traffic from the client;
    redirecting, to the selected proxy server, a Hypertext Transfer Protocol (HTTP) request from the client device, wherein the HTTP request is addressed to a resource on an external server, wherein the proxy server is connected to the client device via the LAN and wherein the proxy server is connected to the external server via the Internet;
    retrieving, by the proxy server, the resource from the external server;
    modifying the resource to change pointers within the resource to point to locations in the domain that is associated with the LAN proxy server and associated with the network; and
    transmitting, by the proxy server, the modified resource to the client device;
    receiving, by the proxy server, a second request that is from the client device and addressed with one of the changed pointers of the modified resource which is addressed to the domain associated with the LAN;
    identifying a second resource on the external server;
    retrieving, by the proxy server, the second resource from the external server;
    modifying the second resource to change pointers within the resource to point to a location in the domain that is associated with the LAN; and
    transmitting, by the proxy server, the modified second resource to the client device.

20. The system of claim 19, wherein redirecting the HTTP request includes:
  intercepting the HTTP request; and
  responding to the HTTP request with an HTTP redirect message that includes an address of the proxy server.

21. The system of claim 19, wherein redirecting the HTTP request includes:
  intercepting a domain name service (DNS) request associated with the HTTP request; and
  responding to the DNS request associated with the HTTP request with a DNS response that includes an address of the proxy server.

22. The system of claim 19, wherein the client device is configured to display at least one changed pointer to a user of the client device.

23. The system of claim 19, wherein modifying the resource is performed based at least in part on a security policy.

24. The system of claim 19, wherein modifying the resource includes replacing the resource with a different resource.

25. The system of claim 19, wherein modifying the resource includes replacing HTTP links in the resource with different HTTP links pointing to locations in the domain associated with the proxy server.

26. The system of claim 19, wherein modifying the resource includes replacing the resource with an HTTP status code object.

27. The system of claim 19, further comprising:
  determining that a security policy of the network identifies the resource for inspection upon entry to the network; and
  in response to determining that the security policy of the network identifies the resource for inspection, inspecting the resource.

* * * * *